F. C. PERKINS.
PROCESS OF PRODUCING AND REFINING STEEL.
APPLICATION FILED MAY 11, 1908.
937,855.
Patented Oct. 26, 1909.
4 SHEETS—SHEET 1.
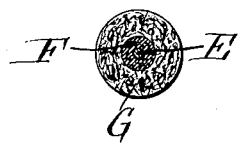
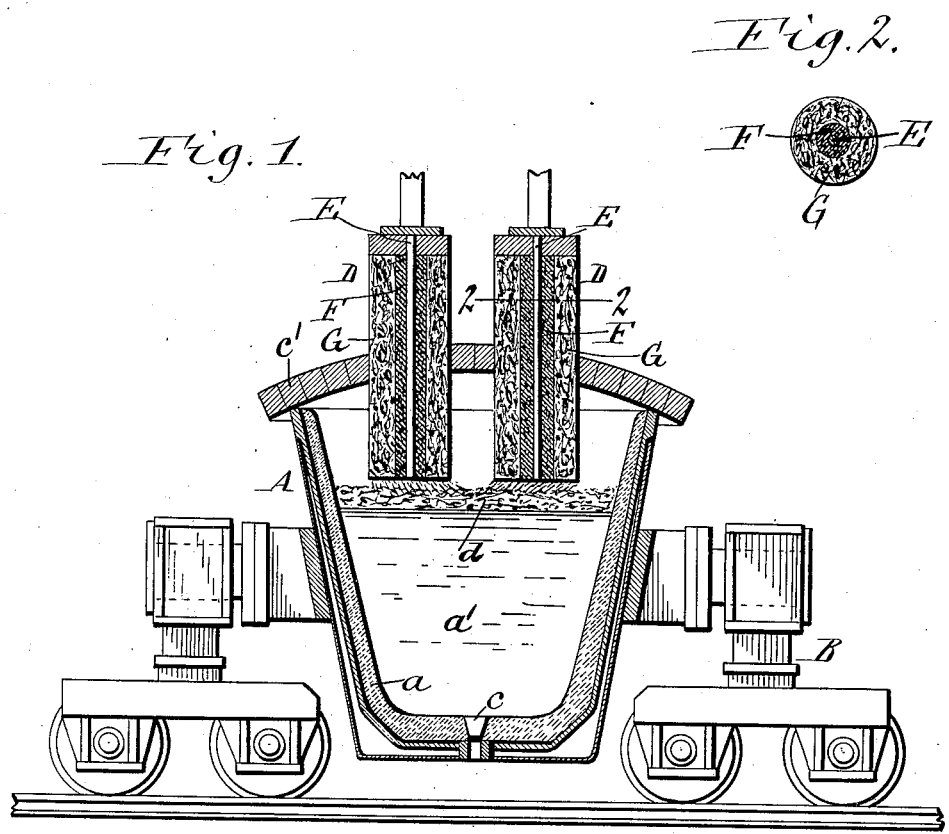
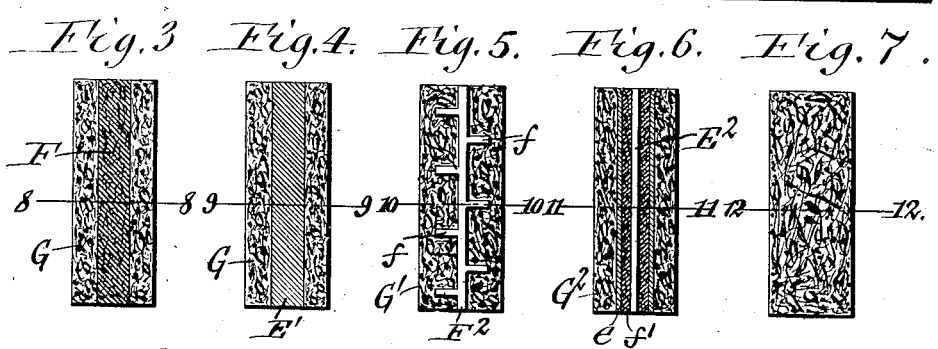
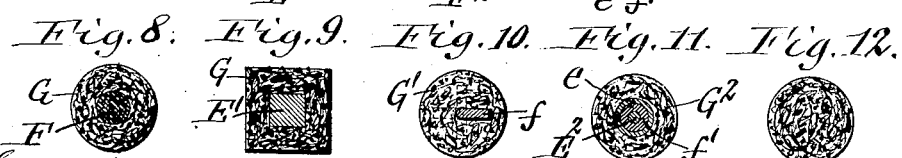
Witnesses.
Frank C. Perkins, Inventor

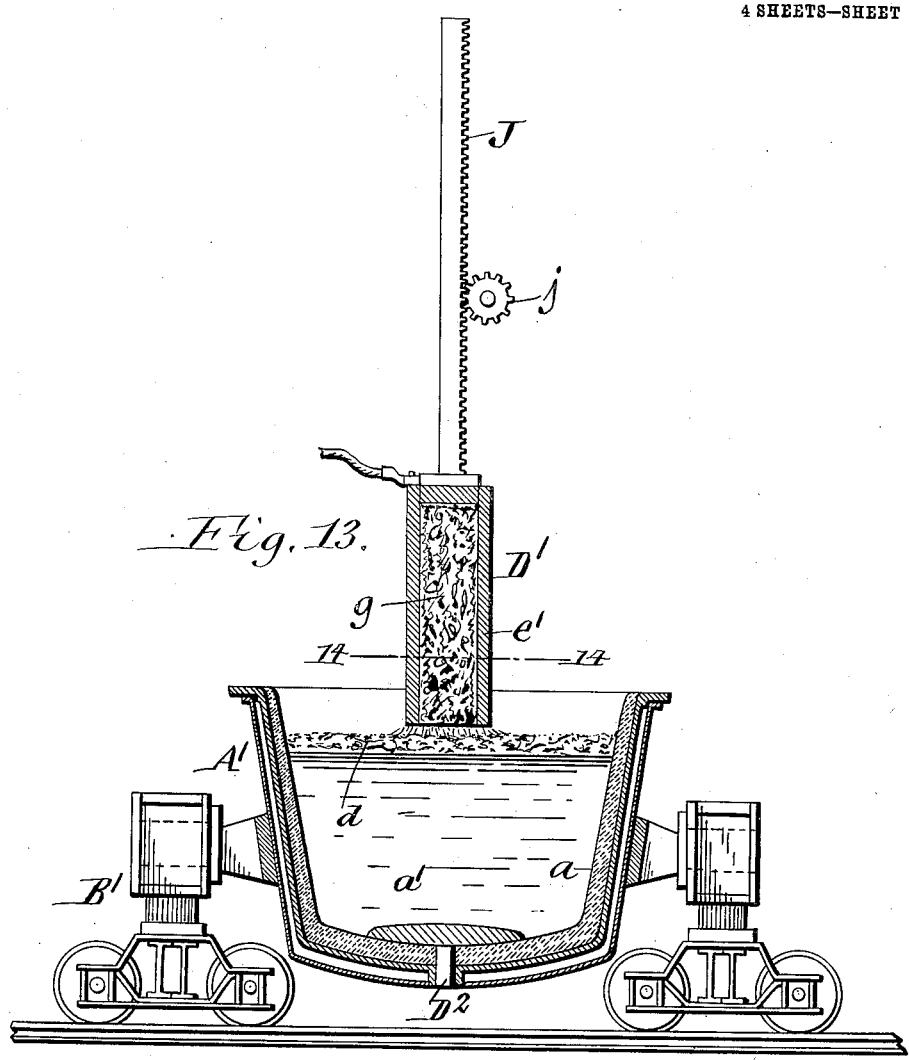

F. C. PERKINS.
PROCESS OF PRODUCING AND REFINING STEEL.
APPLICATION FILED MAY 11, 1908.

937,855.

Patented Oct. 26, 1909.
4 SHEETS—SHEET 3.

Witnesses:—
Gustav W. Nora.
Richard Sommer.

Inventor
Frank C. Perkins

F. C. PERKINS.
PROCESS OF PRODUCING AND REFINING STEEL.
APPLICATION FILED MAY 11, 1908.
937,855.
Patented Oct. 26, 1909.
4 SHEETS—SHEET 4.
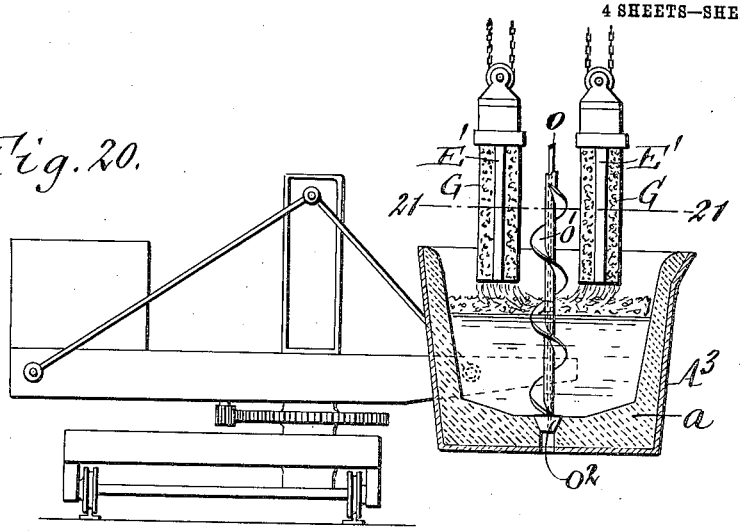
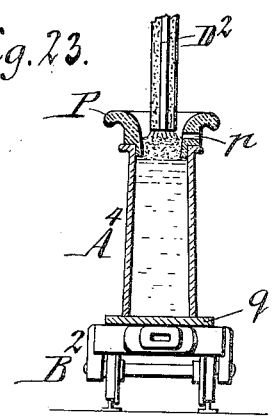
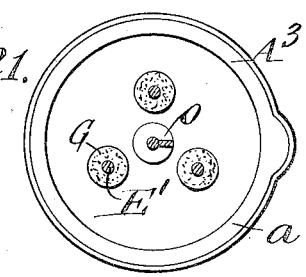
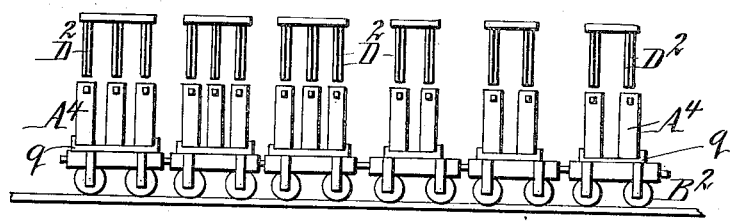
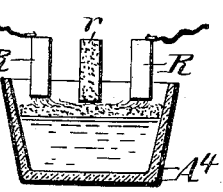
Witnesses:
Gustav W. Hora.
Richard Sommer.
Inventor
Frank C. Perkins

UNITED STATES PATENT OFFICE.

FRANK C. PERKINS, OF BUFFALO, NEW YORK.

PROCESS OF PRODUCING AND REFINING STEEL.

937,855.  Specification of Letters Patent.  Patented Oct. 26, 1909.

Application filed May 11, 1908. Serial No. 432,042.

*To all whom it may concern:*

Be it known that I, FRANK C. PERKINS, a citizen of the United States, residing at Buffalo, in the county of Erie and State of New York, have invented a new and useful Improvement in Processes of Producing and Refining Steel, of which the following is a specification.

This invention relates to an improved process of producing and refining a high grade of steel low in phosphorus and sulfur, and with any percentage of carbon or other additions or analysis desired, and consists in electrically treating molten iron from a blast furnace or while cold or low grade molten steel as taken from a Bessemer converter or open-hearth furnace with electric heat produced by an arc or arcs formed between the slag of the bath and specially designed electrodes, constructed of a cored carbon or a mixture of carbon, and lime and oxid of iron or other slag producing materials in the form of a pencil, or packed in an iron or steel tube or surrounding a carbon or iron rod or rods with or without projections for supporting said materials with a suitable binder, such as tar.

Figure 16:
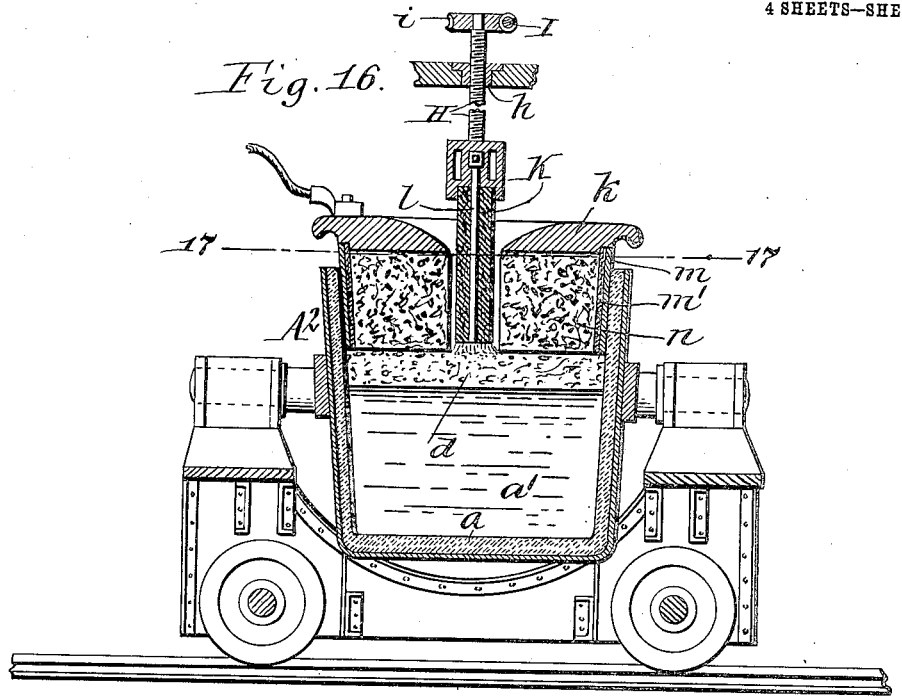
Figure 17:
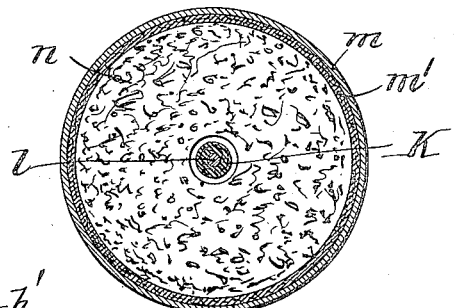
Figure 18:
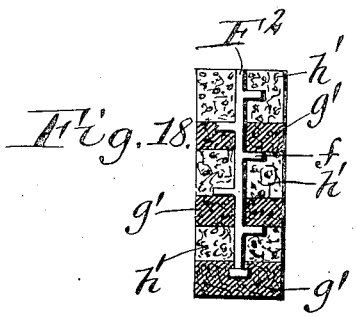
Figure 19:
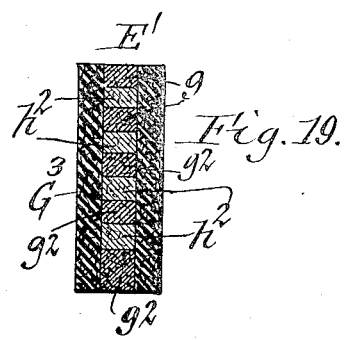

In the accompanying drawings consisting of 4 sheets: Figure 1 is a vertical longitudinal section of one form of apparatus suitable for practicing my invention. Fig. 2 is a horizontal section in line 2—2, Fig. 1. Figs. 3, 4, 5, 6 and 7 are longitudinal sections showing forms of electrodes which may be used in practicing my invention. Figs. 8, 9, 10, 11 and 12 are cross sections in the correspondingly numbered lines in Figs. 3–7. Fig. 13 is a vertical longitudinal section of another form of apparatus for practicing my invention. Fig. 14 is a horizontal section in line 14—14, Fig. 13. Fig. 15 is a section similar to Fig. 14 but showing another form of electrode. Fig. 16 is a vertical sectional elevation showing still another form of apparatus for practicing my invention. Fig. 17 is a horizontal section in line 17—17, Fig. 16. Figs. 18 and 19 are vertical longitudinal sections showing still other forms of electrodes embodying my invention. Fig. 20 shows another form of apparatus using two or three phase current and three carbons forming three arcs with the layer of slag and a rotating refractory stirring paddle in the center also forming the plug for the bottom tapping hole. Fig. 21 is a horizontal section in line 21—21, Fig. 20. Fig. 22 represents a train of ingot molds showing the manner of practicing my invention on the metal in said molds. Fig. 23 is a vertical transverse section, on an enlarged scale, of one mold of the ingot train and showing an insulating head on the mold and a composite electrode within said head. Fig. 24 is a sectional elevation showing another way of introducing the slag materials into the ladle at the arcs formed by the electrodes.

Similar letters of reference indicate corresponding parts throughout the several views.

Referring to Figs. 1 and 2, A represents a crucible ladle or pot which is provided with a basic lining $a$ and which is adapted to hold the bath $a^1$ of iron to be converted in steel or the bath of molten steel to be refined. This ladle, as shown, is mounted on a car B for convenience in transporting the same but the same may be otherwise supported. In its bottom the ladle may be provided with an opening which is normally closed by a plug $c$ or any other suitable manner and which when uncovered permits of withdrawing a quantity of the metal for testing or for pouring the metal from the ladle into ingot molds. If desired, the top of the ladle may be closed by a cover $c^1$ of any suitable construction during the operation of fusing the metal. Projecting downwardly through this cover and forming two electric arcs with the slag $d$ floating on top of the metal bath are two composite electrodes D, D, the electric heating circuit being completed from the source through the two electrodes the two arcs and the layer of slag or the molten metal.

The particular form of each of the electrodes shown in Figs. 1 and 2, consists of a central vertical supporting rod of iron E, a tubular core F of carbon surrounding said rod and a jacket G or outer coating surrounding the carbon core and comprising a slag producing material such as lime. The carbon core may be composed of a mixture of coke and tar and together with the iron supporting rod forms the main electrical conductor of this electrode. The slag producing medium constituting the jacket may consist of a mixture of carbon, iron, oxid of iron, lime or fluor spar or any two of these ingredients. If desired, one or more of these ingredients may be combined with any suitable oxidizing or neutral slag producing material. As these electrodes are consumed at their lower ends the same may be lowered so as to remain in contact at their lower ends with the slag producing the heat by resistance to the current or not in contact forming arcs between the electrodes and the slag or between either electrode and the slag. In the latter case one electrode is in contact with the slag or molten metal. If desired, the iron supporting rod may be omitted from the electrode, as shown in Figs. 3 and 8, in which case the carbon core is preferably constructed of pure carbon with the necessary binder and serves as the main electrical conductor and as the support for the coating or jacket of slag producing material which surrounds the same. Instead of employing a carbon core as the main electrical conductor and support for the jacket this may be effected by means of an iron core $E^1$, as shown in Figs. 4 and 9. It is immaterial as to the particular cross section of the electrode, that for example, shown in Fig. 8 being round while that shown in Fig. 9 is square. For the purpose of more securely interlocking the jacket of slag material with its iron support, the latter may be constructed in the form of a rod $F^2$ having a plurality of lateral projections $f$ which are anchored in the slag producing material $G^1$, as shown in Figs. 5 and 10.

In Figs. 6 and 11, is shown a construction in which a cylinder of iron $e$ is interposed between a central carbon core $f^1$ and a jacket $G^2$ of slag producing material. The carbon core in this last mentioned construction contains a central iron supporting rod $E^2$ similar to the construction shown in Fig. 1, but if desired this central rod may be omitted. By introducing a sufficient quantity of iron, carbon or other electrically conductive material into the slag producing mixture, the electrode may be made wholly of such a mixture which permits of dispensing with a separate carbon or iron conductor or support or a combination of these two, an electrode of this form being shown in Figs. 7 and 12.

In the apparatus shown in Fig. 13 for practicing my invention, a ladle $A^1$ is employed for holding the bath of metal to be refined which is open at the top and closed at the bottom, so that it has to be tilted on its supporting carriage $B^1$ for pouring the contents thereof into an ingot mold or pouring off the slag. This form of furnace also shows the use of but a single electrode $D^1$ in which case the bottom of the ladle carries a second electrode $D^2$ of metal carbon, or other conductor. Figs. 13 and 14 also show another modified construction of composite electrode embodying my invention, the same consisting of a central core $g$ of slag producing materials and a supporting and conducting jacket of iron $e^1$ surrounding the core of slag producing material.

Instead of surrounding the central core of slag producing material by a jacket of iron, as shown in Figs. 13 and 14, this jacket may consist of carbon $f^2$, as shown in Fig. 15. The means for lowering the electrode as its lower end is consumed, which are shown in Fig. 13, consist of an upright gear rack $J$ secured at its lower end to the upper end of the electrode and a driving pinion $j$ meshing with the gear rack and operated by hand, and electric motor or any other suitable means.

Instead of arranging the electrodes side by side when a double pole furnace is desired, as shown in Fig. 1, the same effect may be produced by employing a central movable electrode which may consist of a carbon tube $K$ containing an iron rod $l$, and an annular outer movable electrode surrounding the inner electrode and consisting of an outer shell of iron $m$, an intermediate shell $m^1$ of carbon, an inner body $n$ of slag producing material or materials, and a head $k$ supporting the parts $m$, $m^1$ and $n$, as shown in Figs. 16 and 17. In this last mentioned construction the annular outer movable electrode is preferably so constructed that it forms a cover for the ladle, crucible or pot and is gradually lowered as it disintegrates into the ladle which contains the bath of metal under treatment.

Any one or all of the electrodes may be turned at the same time that they are moved lengthwise toward the slag and bath. The means for this purpose shown in Fig. 16 with reference to the electrode $K$, $l$ consist of an upright screw shaft $H$ which supports the centrode electrode $K$, $l$ at its lower ends and works with its central part in a stationary screw nut $h$ and rotatable worm $I$ which engages with a worm wheel at the upper end of the screw shaft and which may be driven by hand by a motor or motors, or in any other suitable manner. As the screw shaft turns in one direction the electrode $K$, $l$ is turned therewith and is at the same time lowered as the screw shaft works in the nut, thereby compensating for the disintegration of the electrode at its lowered end, thus maintaining the arc. The proper length of arcs may be maintained and the movement of the electrodes may be automatically accomplished with electric motors and any suitable regulating apparatus.

The use of the composite or combination electrode, instead of the usual carbon electrode or an electrode of pure iron, introduces the fresh and additional refining slag materials to the bath fused and in a highly fluid state at the hottest points which are at the arcs or at the points of contact of the electrodes and the layer of slag floating on the bath of molten steel. When two of these electrodes are used in an electric furnace of the double pole type, as shown in Fig. 1, the current passes from one electrode into the slag and through the slag as a resistance and out the other electrode the two arcs operating at about 100 volts pressure, but one electrode may extend into the slag or down into the molten steel below the slag a single arc only being employed at this time formed at the other electrode, with a pressure of approximately 50 volts.

The double pole electric furnace is preferred for practicing my invention because the two electrodes when introduced into the refining slag the latter acts as the resistance and forms one or two arcs according as to whether one or both electrodes are out of contact with the bath and producing the arc or arcs. As shown in Figs. 1, 13, 16 and 20, these electrodes are preferably used in connection with an ordinary basic lined ladle, crucible or pot in the same manner as a basic lined two pole electric furnace, this ladle having received the charge of molten steel from a Bessemer converter, and after being electrically refined by eliminating the phosphorus and sulfur, as far as desired and if necessary deoxidized and recarburized it, the steel is poured into the ingot molds after an electric treatment of from a few minutes to an hour or more according to the degree of refining desired. When only one of these electrodes is used in an electric furnace, as shown in Fig. 13, this electrode extends into the refining slag forming the arc at this point, the current being conducted through the molten bath and out through the bottom of the ladle $A^1$, double arc or single arc action takes place when a ring electrode is arranged on a level with the slag, as shown in Figs. 16 and 17. A single arc action only at center may be employed, the outer electrode dipping into the slag or molten steel. By this electric arc process the molten metal continually circulates, all particles of the bath coming into contact with the refining slag at the arc or arcs and elsewhere and being rapidly refined, remaining at the highest temperature only a short time, then replaced by other particles of molten steel reaching the slag near the arcs.

It is held that in the Heroult arc steel furnace the circulation in the bath is always active and the average temperature may be kept as low as any other furnace and all parts of the bath come rapidly into contact with the slag. In case a deep bath of say 10 or 12 tons or more is used in the ladle $A^3$ and additional circulation is desired, one electrode may be plunged up and down in the metal by a crane or otherwise while the other electrode produces the arc with the slag, or an agitator, stirrer or paddle consisting of a metal core $o$ and a jacket $o^1$ of refractory material surrounding the rod $o$ and having preferably the form of a screw conveyer may be employed, as indicated in Figs. 20 and 21. This stirrer may be rotated and also raised and lowered. In this construction the lower end of the stirrer carries a plug or stopper $o^2$ for opening and closing the outlet in the bottom of the ladle for discharge of the metal.

By the use of the special electrodes made with slag producing materials, the highly fluid slag at the arcs causes rapid circulation to take place and the gases are removed which are often retained in the metal and cause bad steel when poured into the ingot molds directly from the Bessemer converter without electric refining. Furthermore, in this electric refining process segregation of sulfur and phosphorus are avoided while any quality of steel may be produced regardless of the quality of the raw materials.

It is well known that the Bessemer converter process for making steel is far cheaper than the open-hearth process but the quality very largely depends on the metal and other material available, and it is not possible to test the metal during the operation. The resulting steel therefore from high phosphorous and high sulfur charges has an injurious quantity of sulfur and phosphorus which cannot be eliminated by the existing acid Bessemer process. Too much or not enough carbon, manganese, silicon or other elements can readily be corrected and gaged by the charge introduced into the converter and subsequent treatment but phosphorus and sulfur less than .09 and preferably below .05 is desirable and thus is not attainable by the existing present Bessemer process.

The present invention may be utilized as an auxiliary treatment to the Bessemer process for eliminating the phosphorus by employing an oxidizing slag in the bath as the molten metal is treated in the electric ladle with the arc, the auxiliary slag producing materials in the combination or composite electrode acting instantly on the metal and the slag being in a highly fluid state as it melts in the high temperature of the arc. The desired end to be attained by this electric auxiliary process for the Bessemer converter for rail making particularly, is the reduction of phosphorus to .05 or thereabouts by the oxidizing slag and electric arc, the other elements being easily controlled by existing Bessemer methods.

It is well known that with the Heroult electric furnace having pure carbon electrodes and a treatment extending from 75 to 90 minutes or more taking molten metal from an open-hearth furnace and electrically treating same with oxidizing and neutral slags the phosphorus can be brought down to .003 per cent. and the sulfur down below .007 per cent. By the use of the present invention with composite electrodes containing slag producing mixtures it is possible to reduce the phosphorus to .03 or .05 which is 10 to 20 times as much as the above in a far shorter time and within practical limits for Bessemer working. It is also well known that the carbon is always eliminated before the phosphorus and if it is attempted to carry the reduction far enough to lower the phosphorus in an open-hearth furnace the metal is highly oxidized and decarburized. The present invention provides a means of taking the highly oxidized metal from the open-hearth furnace, if carried far enough to eliminate as much phosphorus as desired and by the electric treatment with the electric arc and these special electrodes having neutral slag mixtures it is also possible to eliminate, if desired, nearly the last traces of sulfur, the metal being deoxidized and as much carbon being added as found desirable, producing a finished steel of any degree of perfection desired according to the length of time the electric treatment is carried on.

It may be stated that in metal taken from an open-hearth furnace, if the reduction is carried on long enough to reduce the phosphorus to .01 per cent. or less than this amount, the carbon is eliminated. It is of course true that such a highly oxidized metal would be very unsatisfactory in practice but by means of the electric furnace treatment with these composite or combination electrodes, the arc and proper slag mixtures, introduced in the molten bath, together with the proper mixture in the electrode, themselves acting as auxiliary slag producers, will bring most satisfactory results, eliminating the sulfur, adding the proper amount of carbon and deoxidizing the steel completely.

The proper mixtures can be introduced into the molten bath and also provided in the electrode mixture, to remove the sulfur, on account of the high temperature of the electric arc even though the slags selected would not be fluid at lower temperatures and hence could not be used by any other than the electric treatment without the addition of other slag materials to lower the melting point and this would interfere with the efficiency of operation. The slag mixture is also melted to a highly fluid state at the arc largely from the mixture in the electrode itself, placed there for this purpose, in addition to that supplied in the ordinary way on the top of the bath. Ordinarily there is great trouble and it is very costly to deoxidize the metal by existing processes and it is claimed that pipes and blow-holes are produced in the ingot and other difficulties result from the presence of iron oxids. It is also maintained that when ferro-silicon and ferro-manganese are used to prevent these troubles, the oxids which result stay in the steel as an "emulsion" in a finely divided state. With these special electrodes and the use of an electric arc for refining purposes, materials can be used in the electrodes or added to the bath for a neutral slag, as it is maintained that a thorough deoxidation of the steel is not possible when there are iron oxids in the slag as they will react to a certain extent with the molten bath of steel.

It is held that adding carbon under ordinary conditions will not result in complete deoxidation as both iron carbid and ferrous oxid readily exist together. By means of the electric process of steel refining with these combination or composite electrodes, however, carbon or a mixture of carbon and iron may be added to the slag as an auxiliary to the carbon mixture of the electrode, forming calcium carbid and resulting in deoxidation without the slightest difficulty, at no great expense, and on any scale desired by providing electric arc apparatus for several electric furnace ladle cars arranged for serving various Bessemer converters or open-hearth furnaces. The desired amount of manganese can be added for counteracting the bad effects from the ferrous oxid, the carbon reducing the manganese ore which has been added to the slag and taking out the last traces of ferrous oxid leaving the steel bath protected by the layer of slag from oxygen in the air so that no further oxidation takes place.

The determining questions of the electric refining of steel are cost and output. By shortening the time of treatment with these special composite electrodes combined with slag producing mixtures, and refining only down to such percentage of phosphorus and sulfur as are essential for rails and structural steel, the electric power consumed is so low and the time required so short as to be practical for this work.

By this process cheap ores can be used having higher phosphorus and sulfur, these ores being abundant while high grade ores are nearly exhausted.

By this process of only taking the metal from the converter or open-hearth furnace when it is nearly finished steel and molten, only completing refining operation electrically, only 1/4 of the electric power and less time is required than when electrically heating from cold metal. It is of value as an auxiliary process to the Bessemer converter and open-hearth furnace, taking the molten metal with little loss of heat and refining same to any degree, according to time taken, the mixtures of carbon and iron or steel combination electrodes used and nature of slags employed.

While this process is specially adapted to the refining of molten steel taken from the Bessemer converter and open-hearth furnaces and treated in an electric furnace or ladle, it is not confined to this as the identical process will convert iron into steel from molten or cold state without being previously treated in a Bessemer converter. Any grade of steel may be made regardless of quality, raw materials and carbon may be eliminated from electrodes for special steel making, the current being conducted to the arc by the iron rod instead of carbon and iron oxid, of composite electrode.

The neutral slag electrodes may work with a low current arc or dipping into slag and heating by resistance and the steel may be kept for hours under this molten neutral slag without changing its quality. The metal may be cast, remelted or worked over to a higher or lower grade or it may be cooled, chilled and melted a second time without injuring the quality of the steel. The cost of production in this process is low as most of the work of steel making is done by the Bessemer converter or open-hearth furnace, only the removal of small percentages of the phosphorus or sulfur from the steel being attempted, this being a good product for the larger rolling mills which supply demand of rail and structural steel interests. The partial removal of the injurious phosphorus and sulful reduces the time to a few minutes instead of hours, hence reduces the current required per ton. The shorter time also lowers cost of linings and refractory materials per ton of metal as many charges may be treated in same time required for treating one open-hearth charge. This shorter time process, only reducing phosphorus from .09 to .05 for rail steel instead of to .003 which is possible by longer treatment, makes it a practical process for rail mills dealing with Bessemer converters treating full charges of 15 tons in electric ladles, handled by cranes taking same to positions where electrodes are inserted. After treatment the metal is drawn from bottom of ladle, or tilted and poured into the ingot molds after slag has been removed. These easy methods are of vital importance as any new process for removing phosphorus or sulfur, should not interfere with present rapid steel production; should not greatly increase the cost for power, should not cause excessive cost for basic linings or electrodes, or slag producing materials, and should be readily used as an auxiliary process in existing Bessemer plants.

In Fig. 18 is shown an electrode having an iron core $F^2$ supporting alternate layers $g^1$, $h^1$ of oxidizing slag producing materials and neutral slag producing materials while in Fig. 19 is shown an electrode having a tubular jacket $G^3$ of carbon which incloses alternating layers $g^2$, $h^2$ of oxidizing slag producing material and neutral slag producing material, a layer of oxidizing slag producing material being lowermost in both cases. In using such an electrode the lower part of the same carrying the oxidizing slag producing mixture may come first into play and effect a reduction of the phosphorus in the steel to a low percentage after which the materials in the next layer of the electrode of neutral slag producing materials may come into use forming a neutral slag which eliminates the sulfur, deoxidizes the metal and at the same time recarbonizes it.

The process of partially refining steel may be also carried out in ingot molds with these composite electrodes to a sufficient degree to lower the percentage of phosphorus, and greatly improve the steel at the same time also reducing blow holes and entirely removing the injurious effects of piping as indicated in drawings, Figs. 22 and 23. Two or three ingot molds $A^4$ on a car B may be electrically treated with two or three arcs in a special refractory head P and having a tap hole $p$ to draw off the slag, the head protecting the top of the mold and setting into it.

Any phase current may be used, the plurality of composite electrodes $D^2$ entering their refractory and insulating head forming the arcs at the surface of the metal, the current being completed through the ingot mold and bottom plate $q$ on the car $B^2$. One electrode on a single ingot car or two electrodes with two ingots on a car would operate with a single or double arc, in the former case the single electrode forming one terminal and the molten metal, ingot mold and bottom plate of car completing the circuit. The same process partially refines steel in the ingot molds taking only a few minutes, the current being reduced to a low point allowing the metal in the bottom of the mold to cool first, only a small arc keeping the metal in top of the mold fluid a trifle longer than the bottom. After removing the electrodes the slag and then the head, the top of the metal cools last. Incidentally the keeping of the top hotter while the bottom is cooling removes the causes of blow holes, bubbles and pipes. These advantages are gained without requiring the heating of the top of the metal by gas or the compression of the ingot after being stripped in a semi-fluid state by hydraulic pressure.

Instead of combining the slag producing mixture integrally with the electrode, a block or rod $r$ of such material may be arranged between two electrodes R, R', as shown in Fig. 24, in which case the heat from the arc at the lower ends causes the slag producing block between the same to melt and to be added to the slag floating on the metal bath in the ladle $A^4$.

I claim as my invention:

1. The hereindescribed process of producing steel from molten iron which consists in treating an iron bath by an electric current which traverses an electrode containing iron in the presence of the iron bath and supplying a slag producing medium at the arc from said electrode.

2. The hereindescribed process of producing steel from iron which consists in fusing an iron bath by an electric current which traverses an electrode containing iron in the presence of the iron bath, and supplying a slag producing medium at the arc of said electrode from said electrode.

3. The hereindescribed process of producing steel from iron and refining steel which consists in fusing the iron and treating the molten iron and steel by an electric current which traverses a pair of electrodes containing iron having their ends arranged at the surface of the iron bath and forming an arc with the slag between them, and supplying a slag producing material at said arc from said electrode.

4. The hereindescribed process of producing steel from a molten iron bath which consists in conducting an electric current in the presence of said iron bath by a composite electrode containing iron and surrounded by slag producing materials.

5. The hereindescribed process of producing steel from an iron bath which consists in conducting an electric current in the presence of the iron bath by a composite electrode containing iron and a mixture of slag producing materials.

6. The hereindescribed process of producing steel from iron which consists in conducting an electric current in the presence of iron by an electrode containing an iron conductor and a slag producing material.

7. The hereindescribed process of producing steel from molten iron from a blast furnace which consists in conducting an electric current in the presence of the molten iron by an electrode containing a conductor as a core, a carbon cylinder inclosing the core and an iron slag producing material inclosing the carbon cylinder.

8. The hereindescribed process of refining steel which consists in conducting an electric current in the presence of a low grade steel bath through an iron electrode containing a carbon core and a jacket of slag producing material surrounding said core.

9. The hereindescribed process of refining steel which consists in conducting an electric current in the presence of a low grade steel bath through a tubular iron electrode containing a carbon core, an iron rod arranged within the core and a jacket of slag producing material surrounding said core.

10. The hereindescribed process of refining steel, which consists in conducting an electric current in the presence of a low grade steel bath through a composite electrode containing iron and a slag producing material comprising lime.

11. The hereindescribed process of refining steel, which consists in conducting an electric current in the presence of a low grade steel bath through a composite electrode containing iron and a slag producing material comprising lime and fluor spar.

12. The hereindescribed process of refining steel which consists in treating the metal by conducting a current of electricity through an iron composite electrode in the presence of a bath of low grade steel contained in a basic lined receptacle, said electrode being combined with a slag producing material.

13. The hereindescribed process of producing high grade steel which consists in treating molten low grade steel by the arc of an electrode in the presence of a refining slag, said electrode containing iron and a mixture containing a slag producing material.

14. The process of producing high grade steel which consists in treating low grade molten steel in an electric furnace with an electric arc in the presence of a refining slag, the electrode of said furnace comprising in its mixture carbon, oxid of iron, lime and fluor spar as slag producing materials.

15. The hereindescribed process of producing high grade steel which is low in phosphorus, from low grade Bessemer converter steel which is high in phosphorus, by electrically treating the molten metal as it comes from a converter with an electric arc in the presence of a refining oxidizing slag, the electrode forming said arc containing iron and a slag producing material.

16. The process of producing high grade steel low in phosphorus, from low grade Bessemer converter steel high in phosphorus, by electrically treating the molten metal as it comes from the Bessemer converter in an electric furnace with an electric arc in the presence of a refining oxidizing slag, the electrode of the furnace containing iron, carbon and lime.

17. The hereindescribed process of producing high grade steel which is low in sulfur from Bessemer converter steel which is high in sulfur, by treating the molten metal as it comes from the converter with an electric arc in the presence of a refining neutral slag, said arc being formed at the end of an iron composite electrode which is combined with a neutral slag producing material.

18. The process of producing high grade steel low in sulfur from Bessemer converter and open hearth steel high in sulfur, by electrically treating the molten metal as it comes from the Bessemer converter in an electric furnace with an electric arc in the presence of a refining neutral slag, said furnace containing an electrode consisting of a mixture of iron, carbon and slag producing materials.

Witness my hand this 7th day of May, 1908.

FRANK C. PERKINS.

Witnesses:
 THEO. L. POPP,
 ANNA HEIGIS.